United States Patent [19]

Yui

[11] Patent Number: 4,578,812

[45] Date of Patent: Mar. 25, 1986

[54] DIGITAL IMAGE PROCESSING BY HARDWARE USING CUBIC CONVOLUTION INTERPOLATION

[75] Inventor: Yoshio Yui, Tokyo, Japan

[73] Assignee: NEC Corporation, Japan

[21] Appl. No.: 556,707

[22] Filed: Nov. 30, 1983

[30] Foreign Application Priority Data

| Dec. 1, 1982 [JP] | Japan | 57-210967 |
| Dec. 1, 1982 [JP] | Japan | 57-210968 |
| Dec. 1, 1982 [JP] | Japan | 57-210969 |
| Dec. 1, 1982 [JP] | Japan | 57-210970 |

[51] Int. Cl.$^4$ ............................................... G06K 9/00
[52] U.S. Cl. ........................................ 382/41; 382/14; 382/47; 358/11; 358/140; 358/180
[58] Field of Search ................. 382/14, 15, 47, 41; 358/10, 11, 137–141, 180

[56] References Cited

U.S. PATENT DOCUMENTS

| 3,267,439 | 8/1966 | Bonner ................................... 382/14 |
| 3,325,787 | 6/1967 | Angell et al. ......................... 382/14 |
| 3,581,281 | 5/1971 | Martin et al. ......................... 382/14 |
| 3,609,686 | 9/1971 | Savory et al. ......................... 382/14 |
| 4,066,999 | 1/1978 | Spanjersberg ........................ 382/14 |

*Primary Examiner*—Leo H. Boudreau
*Attorney, Agent, or Firm*—Ostrolenk, Faber, Gerb & Soffen

[57] ABSTRACT

Disclosed is hardware for providing pixel data by interpolation. In the hardware previously memorized weight factors corresponding to the particular site are retrieved under the influence of the outputs of addressing circuits, multiplied with the original pixel data corresponding to the site prior to convolution and the products added together to derive the new pixel data which is subsequently stored in a memory. Also disclosed is hardware for rapidly enlarging an image. In this hardware, four lines, for example, of original pixel data are read out and, according to the degree of enlargement required, a predetermined sequence of weight factors are simultaneously applied to sixteen original pixel data (four from each line) to determine the data for the site or sites in question.

10 Claims, 12 Drawing Figures

DIGITAL IMAGE PROCESSING BY HARDWARE USING CUBIC CONVOLUTION INTERPOLATION

BACKGROUND OF THE INVENTION

1. Field of the Invention

This invention relates to digital image processing through hardware using a so-called cubic convolution interpolation technique.

2. Description of the Prior Art

Digital image processing, the manipulation of images by computer, is a relatively recent development. In its short history, it has been applied to a variety of technical fields involving space, medical and color printing technologies, etc., with varying degrees of success.

In connection with space technology, for example, remote sensing data transmitted from unmanned satellites inherently involves geometric distortions (for example) and hence is required to undergo digital image compensation processing in order to obtain desired images. The digital image processing involves conversion of coordinate's axes of two-dimensional digital data, image enlargement, decompression, etc.

The coordinate conversion of the two-dimensional digital data is known as "resampling". In order to resample the digital input data, data processing techniques such as nearest neighbor interpolation, bilinear interpolation, and interpolation using the cubic convolution method are known.

The nearest neighbor interpolation is the simplest interpolation scheme, wherein the data of the output pixel (picture element) is taken to be that of the input pixel nearest to the position to which it maps. This interpolation however encounters a problem that introduces a sawtooth effect at the edges of the obtained image. On the other hand, bilinear interpolation obtains the output pixel by interpolating adjacent four-pixel neighborhoods, but still does not provide sufficient smoothing in contours. This problem is particularly notable if the geometric operation involves magnification.

The cubic convolution method, which will be described in detail hereinlater, is free from the problems of the above two interpolation techniques. The cubic convolution method involves executions of complex equations and is currently implemented by software, resulting in a large amount of wasteful time and the requirement of large capacity host computer.

SUMMARY OF THE INVENTION

The object of the present invention is to implement a digital image using cubic convolution interpolation through the use of hardware in place of the currently employed software.

Another object of the present invention is to provide a hardware arrangement for processing a multiband digital image, via cubic convolution interpolation, at high speed with a simple circuit configuration.

Still another object of the present invention is to provide a digital image processing apparatus which includes an improved weight factor memory requiring reduced number of memory units.

Still another object of the present invention is to provide a digital image processing apparatus using cubic convolution interpolation, which apparatus is best suited for enlarging original digital image at high speed.

The invention takes the form of a digital image processing apparatus comprising, a first memory for containing original pixel data, a second memory for containing a weight factor table therein, a first means for generating, (a) address signals for consecutively reading out, from said first memory, the original pixel data according to locations wherein new pixel data are to be determined, and (b) a control signal for selecting weight factors from said weight factor table according to said locations, a second means supplied with the original pixel data read out from said first memory and also supplied with the selected weight factors from said first means, for multiplying said read out original pixel data by said selected weight factors and adding the products of the multiplication to determine each new pixel data, and a third memory for storing said new pixel data in predetermined memory locations.

BRIEF DESCRIPTION OF THE DRAWINGS

The features and advantages of the present invention will become more clearly appreciated from the following description taken in conjunction with the accompanying drawings in which like blocks or circuits are denoted by like reference numerals and in which.

DETAILED DESCRIPTION OF THE PREFERRED EMBODIMENTS

Prior to the description of the preferred embodiments of this invention, interpolation using the cubic convolution will first be discussed.

Figure 1:
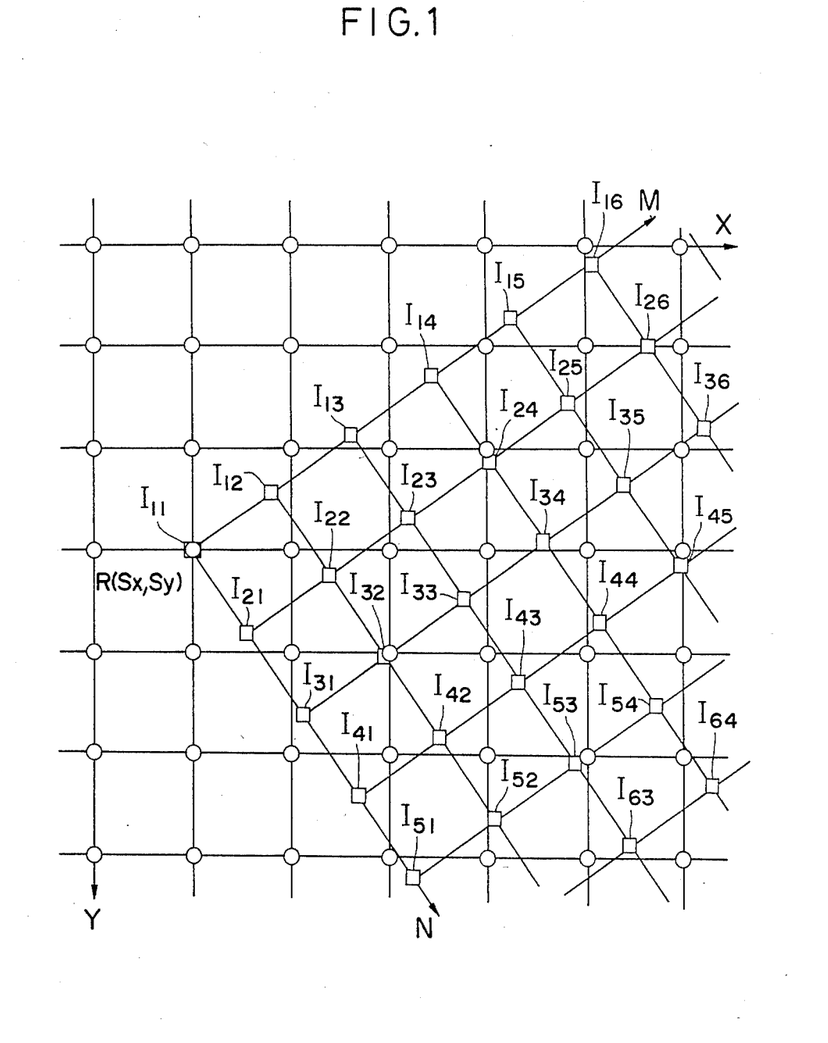
FIG. 1 is an illustration showing an example of the relationship between a two-dimensional coordinate system of original pixel data and a new system wherein pixel data is to be derived using cubic convolution.

FIG. 1 is an illustration showing an example of the relation between two-dimensional distributions of original (input) and rearranged (output or new) pixels. The original pixels are located, in an original coordinate system defined by X- and Y-axes, at regular intervals at the intersections (denoted by circular symbols) of a lattice of unit squares. While, the rearranged pixels $I_{11}$, $I_{12}$, ..., $I_{45}$, $I_{55}$, ..., are regularly mapped, in a new coordinate system defined by M- and N-axes, at the intersections (denoted by rectangular symbols) of another lattice of the unit squares. It should be noted that $I_{11}, I_{12}, \ldots, I_{45}, I_{55}, \ldots$, may be used to denote the locations or coordinates of corresponding new pixels. As shown, the M- and N-axes of the new coordinate system have an inclination (about 35 degrees in this case) with respect to the X- and Y-axes of the original coordinate system around an intial location R(Sx, Sy) or $I_{11}$, so that most of the new pixels fall in the space between neighboring four input pixels. The interpolation is therefore required for determining the locations and values of the new pixels which fall in fractional coordinates in the original coordinate system.

Briefly, interpolation using the cubic convolution is implemented by the following steps: (1) determining the location of each new pixel in terms of the original coordinates (addressing) and (2) determining the value of the new pixel using the values of 16 neighboring original pixels.

Figure 2:
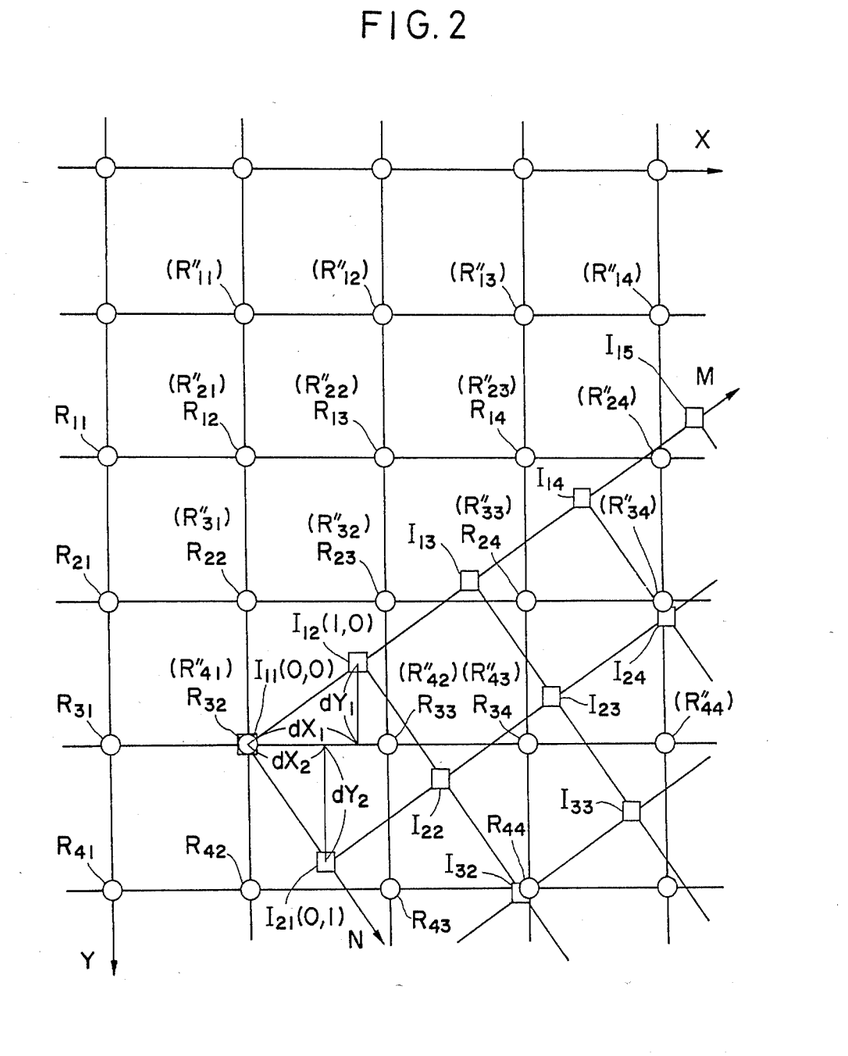
FIG. 2 is an enlargement of a section of the FIG. 1 illustration.

FIG. 2 is an enlarged illustration of a portion of FIG. 1 showing the implementation of the cubic convolution in more detail.

In FIG. 2, the location (or address) of the new pixel $I_{12}$ having the coordinates (1,0) in terms of the new coordinate system is specified by the original coordinates $((Sx + dX_1), (Sy + dY_1))$ in terms of the original coordinate system, while the location of the output pixel $I_{21}$ having the coordinates (0,1) in terms of the new coordinate system is specificed by the original coordinates $((Sx + dX_2), (Sy + dY_2))$ in terms of the original coordinate system. Consequently, an arbitrary new location I(p,q) (not shown in FIG. 2) in the new coordinate system is specified by the original coordinates:

$$\text{(the coordinate on M-axis)} = Sx + dX_1 \cdot p + dX_2 \cdot q \quad (1)$$

$$\text{(the coordinate on N-axis)} = Sy + dY_1 \cdot p + dY_2 \cdot q \quad (2)$$

wherein
Sx, Sy, p and q are whole number integers, and
$dX_1$, $dX_2$, $dY_1$ and $dY_2$ are real numbers.

Thus, each pair of coordinates of new pixels is determined using the original coordinates, and, in most cases, involves a fraction as mentioned previously. FIG. 2 will again be referred to hereinlater.

Figure 3:
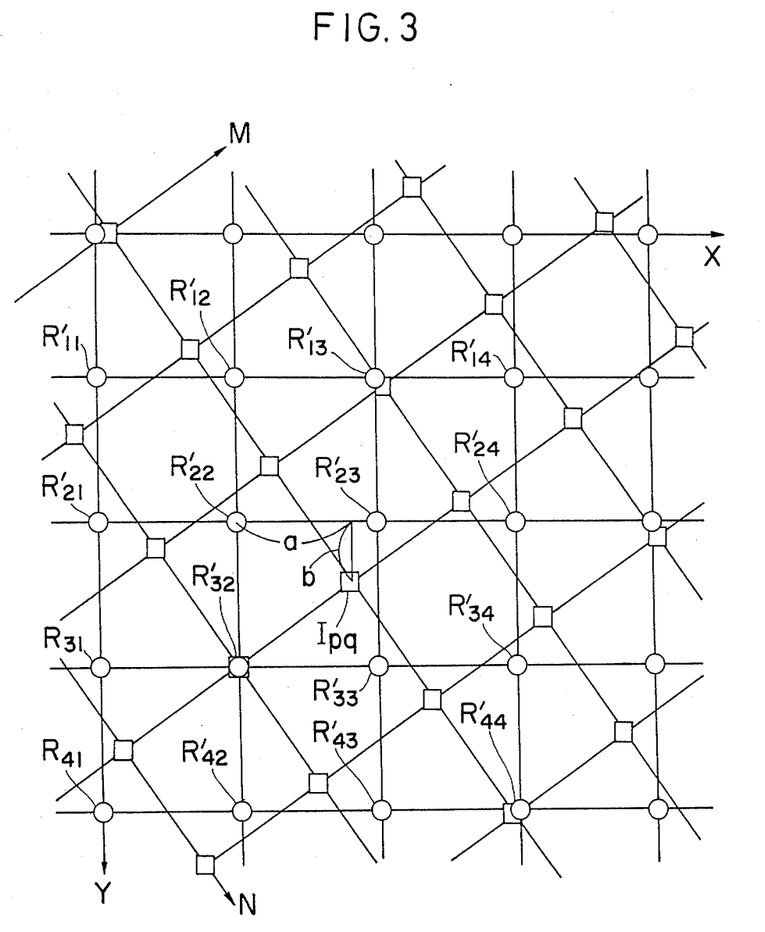
FIG. 3 is an illustration similar to that shown in FIG. 2 which is provided for the purposes of further clarifying the cubic convolution method of interpolation with which the invention is concerned.

FIG. 3 is an illustration similar to FIG. 2 but showing another part of the distributions of new and original pixels for further description of the cubic convolution method. To facilitate description a pixel value will be denoted by parenthesizing the location or coordinates thereof. According to interpolation via cubic convolution, the arbitrary new pixel data $[I_{pq}]$ is determined by the following equation.

$$[I_{pq}] = \sum_{i=1}^{4} \sum_{j=1}^{4} f_{ij}(a,b) \times [R'_{ij}] \quad (3)$$

wherein:
i, j are positive integers each having a value between 1 and 4 inclusive;
$f_{ij}(a,b)$ is a weight factor for a location $R_{ij}'$; and
$[R_{ij}']$ is an original pixel value at $R_{ij}'$.
Equation (3) indicates that $[I_{pq}]$ is determined by multiplying respectively 16 original pixel data surrounding $I_{pq}$ (i.e. $[R_{12}']$, $[R_{12}']$, ..., $[R_{43}']$, $[R_{44}']$) by 16 weight factors $f_{11}, f_{12}, \ldots, f_{43}$ and $f_{44}$.

Further discussion relating to the principle of the cubic convolution method will not be given in that it is deemed to be known to those skilled in the art (for example, see "Digital Image Processing of Earth Observation Sensor Data", IBM J. RES. DEVELOP., January 1976, pp. 40-57).

Figure 4A:
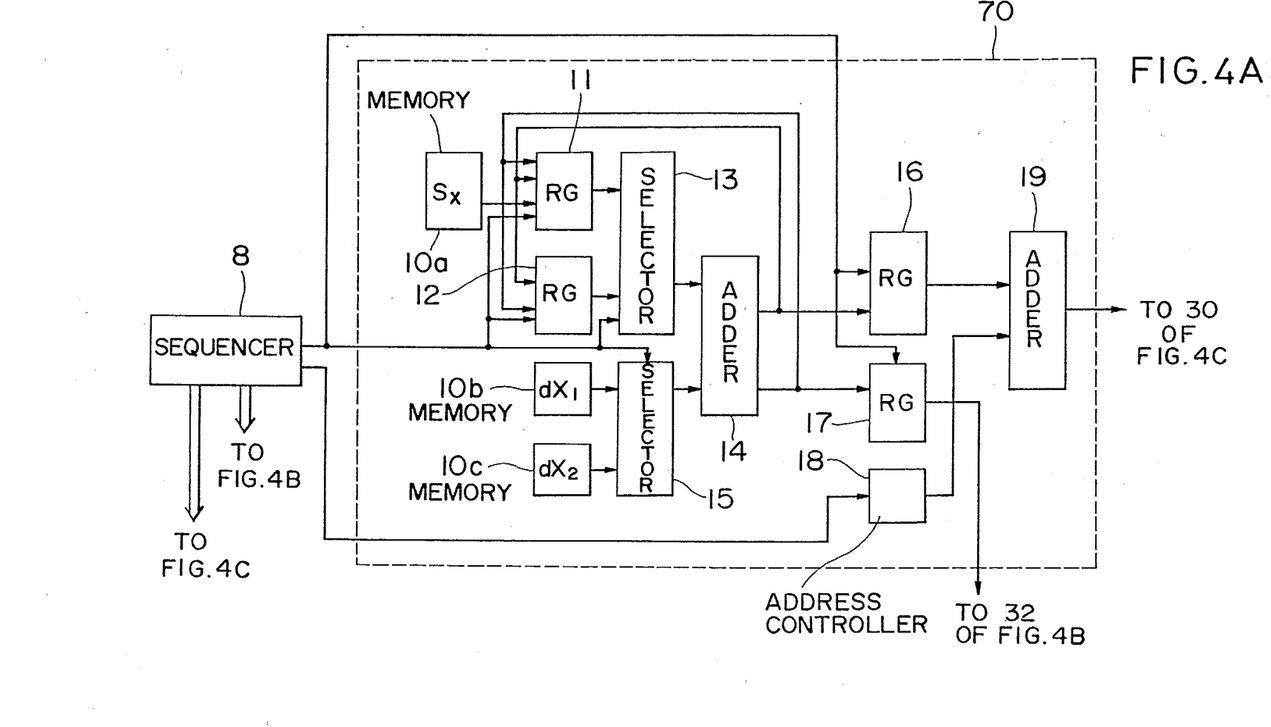
FIGS. 4A to 4C show in block diagram form a first embodiment of the present invention.
Figure 4B:
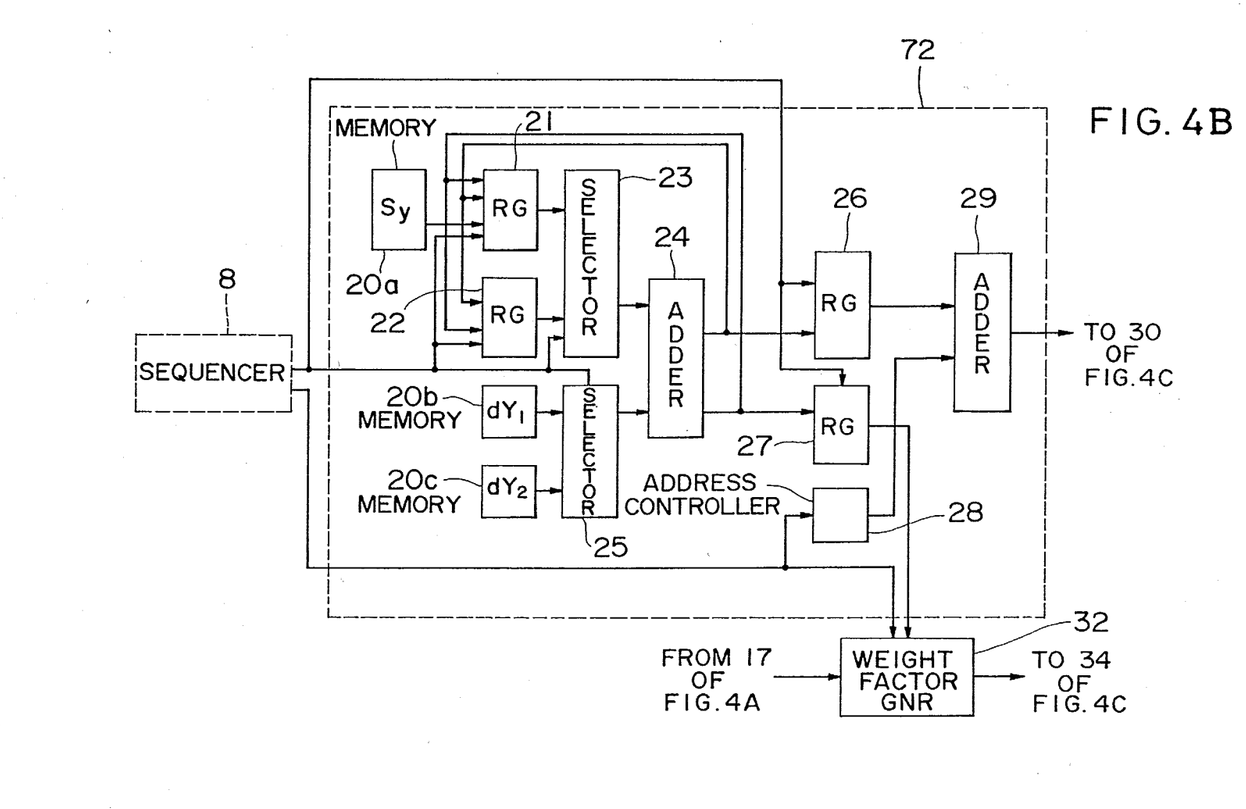
Figure 4C:
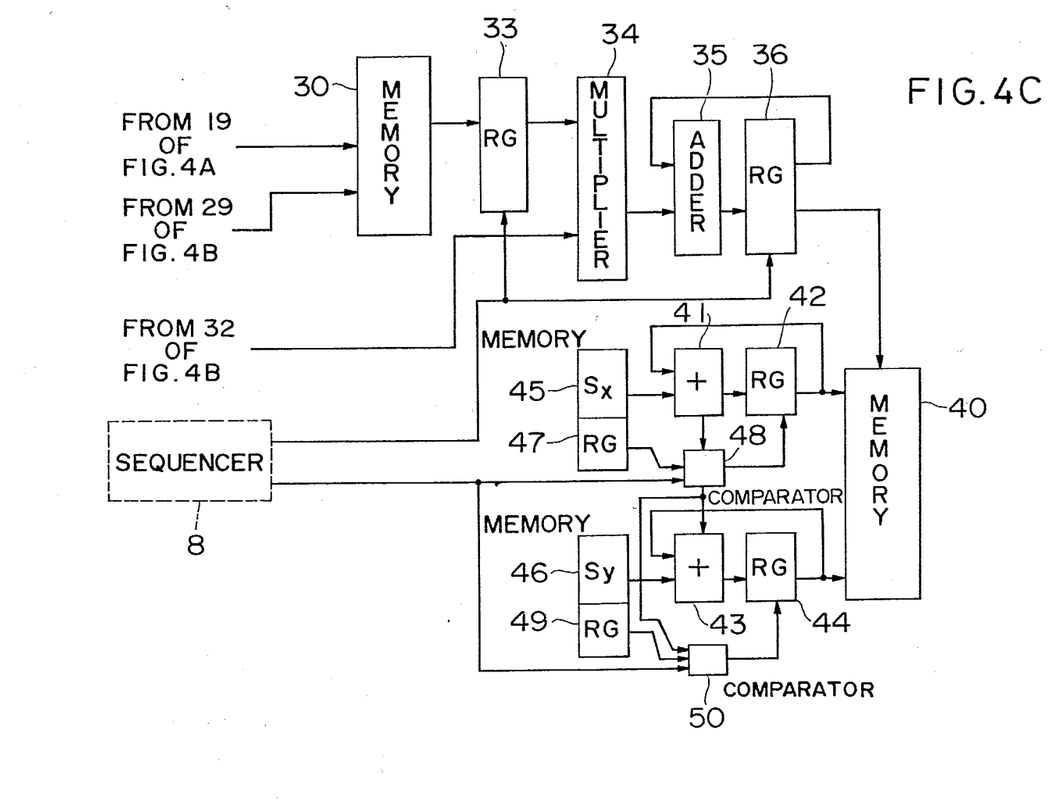

Referring now to FIGS. 4A-4C, there is shown in block diagram forms a first embodiment of this invention. FIG. 4A is a block diagram showing an X-axis addressing section 70 and a sequencer 8. FIG. 4B is a block diagram showing a Y-axis addressing section 72, and a weight factor memory 32. For ease of understanding the sequencer 8 is shown in this Figure in phantom. FIG. 4C is a block diagram showing circuitry for determining the values of new pixels and storing them in the new coordinate system. This Figure shows the sequencer 8 of FIG. 4A in phantom.

The operation of the first embodiment (FIGS. 4A-4C) will be described with reference to FIG. 2.

The X-axis and Y-axis addressing sections 70 and 72 are provided for (1) reading out, from an original data memory 30, original pixel data surrounding each new pixel location and (2) obtaining the corresponding 16 weight factors.

The X-axis addressing section 70 comprises memories 10a, 10b and 10c, registers 11, 12, 16 and 17, selectors 13 and 15, adders 14 and 19, and an address controller 18, all of which are coupled as shown.

The Y-axis addressing section 72 has a configuration silmilar to section 70 and comprises memories 20a, 20b and 20c, registers 21, 22, 26 and 27, selectors 23 and 25, adders 24 and 29, and an address controller 28, all of which are coupled as shown.

The memory 30 (FIG. 4C) is provided with, by way of example, 512×512 memory cells and contains the original data therein. The weight factors are previously determined and written into the weight factor memory 32.

In operation, the coordinates Sx and Sy of the initial point (Sx, Sy) are prestored in the memories 10a (FIG. 4A) and 20a (FIG. 4B) respectively, while the reference values $dX_1$, $dX_2$, $dY_1$ and $dY_2$ are prestored in the memories 10b, 10c (FIG. 4A), 20b and 20c (FIG. 4B), respectively. This assumes that the new pixels (=m×n) are interpolated in the order of $(I_{11}, I_{12}, \ldots, I_{1m})$, $(I_{21}, I_{22}, \ldots, I_{2m})$, $(I_{31}, I_{32}, \ldots, I_{3m})$, $\ldots$, $(I_{n1}, I_{n2}, \ldots, I_{mn})$.

Determining or interpolating the new pixel value $[I_{11}]$ will first be described. As seen from FIG. 2, the new pixel $I_{11}$ coincides with the initial point (Sx, Sy). The register 11 receives the coordinate Sx from the memory 10a in response to a sequence control signal from the sequencer 8 and stores it therein. In this case, the selector 13 selects the register 11, while the selector 15 is rendered inoperative, i.e. select neither the memory 10b nor 10c. The adder 14 is arranged for applying an integer and fraction of the sum to the registers 16 and 17 respectively. In this case, however, the output of the adder 14 consists of the integer (i.e., Sx) so that Sx is supplied to the register 16. Thus, the coordinate Sx is fed to the memory 30. Simultaneously, the register 21 of the Y-axis addressing section 72 receives the coordinate Yx from the memory 20a in response to the sequence control signal and stores it therein. In this case, the selector 23 selects the register 21, while the selector 25 is rendered inoperative, i.e. does not perform a selecting operation. The adder 24 functions in a manner similar to the adder 14 whereby the output of the adder 24 (i.e., Sy) is applied only to the register 26. Thus, the coordinate Sy is fed to the memory 30. It should be noted that in this case the address controllers 18, 28 and the weight factor memory 32 are rendered inoperative.

The original pixel data [R(Sx, Sy)] is therefore read out from the memory 30. In this instance, since the original pixel data [R(Sx, Sy)] equals the new pixel data [I$_{11}$], it is transferred to a memory 40 (FIG. 4C) via a register 33, a multiplier 34, an adder 35 and another register 36 under the influence of the sequence control signal.

The interpolation of the next new pixel I$_{12}$ will be discussed. The selectors 13 and 15 select the registers 11 and 10b, respectively. Consequently, the adder 14 adds Sx and dX1, and applies the whole integer and fractional portions of the algebraic sum of (Sx+dX$_1$) to the registers 16 and 17, respectively. Viz., Sx is fed to the register 16 while dX$_1$ to the register 17. The adder 14 feeds back its result to the register 12 in response to the sequence control signal, while the register 11 maintains its content viz., Sx. The registers 16 and 17 respectively apply the whole integer and fractional portions of the sum to the adder 19 and the weight factor memory 32 (FIG. 4B). The adder 19 also receives an address control signal from the address controller 18, which selectively outputs one of four address control values of −1, 0, +1 and +2 in response to the sequence control signal, for selecting neighboring original four pixels in the direction of X-axis. Initially, the address controller 18 outputs a signal having a value of −1. Consequently, the adder 19 supplies the memory 30 with an X-axis address signal specifying R$_{11}$, R$_{21}$, R$_{31}$ and R$_{41}$.

Similarly, the register 21 of the Y-axis addressing section 72 (FIG. 4B) receives the coordinate Sy from the memory 20a and stores it therein. The selector 23 selects the register 21 while the selector 25 selects the memory 20b. The adder 24 adds Sy and dY$_1$, and applies the whole integer and fractional portions of the algebraic sum of (Sy+dY$_1$) to the registers 26 and 27, respectively. Simultaneously, the adder 24 applies the sum to the register 22 in response to the sequence control signal from the sequencer 8. The registers 26 and 27 respectively apply the whole integer and fractional portions of the sum to the adder 29 and the weight factor memory 32. The adder 29 receives an address control signal from the address controller 28. The controller 28 selectively outputs one of four address control values of −1, 0, +1 and +2 in response to the sequence control signal, for selecting neighboring original four pixels in the direction of X-axis. In the initial step, the address controller 28 outputs a signal having a value of −1. Consequently, the adder 29 supplies the memory 30 with a Y-axis address signal specifying R$_{11}$, R$_{12}$, R$_{13}$ and R$_{14}$.

The outputs of the adders 19 and 29, which indicate the address of the original pixel point R$_{11}$, are fed to the memory 30 from which the data of the point R$_{11}$ is read out and applied to the memory output register 33. The weight factor memory 32 receives the outputs of the registers 17 and 27, and outputs a weight factor f$_{11}$ which corresponds to R$_{11}$. The multiplier 34 is supplied with the outputs of the register 33 and the weight factor memory 32, multiplies them and applies the product (=f$_{11}$×[R$_{11}$]) to the adder 35. In this intial stage, the content of the register 36 has been cleared and hence the result of the adder 35 is stored within the register 36.

Subsequently, the address controller 18 outputs a control signal having a value of 0 while the output of the address control 28 remains unchanged (i.e. −1). Consequently, the pixel value at R$_{12}$ is read out from the memory 30. On the other hand, the weight factor f$_{12}$ is read out from the weight factor memory 32 in response to the sequence signal. The outputs of the memory 30 and the weight factor memory 32 are multiplied at 34 and the product (=f$_{12}$×R$_{12}$) are applied to the adder 35. The adder 35 adds (f$_{11}$×R$_{11}$) and (f$_{12}$×R$_{12}$), the sum of which is stored in the register 36. The operations similar to the above are repeated 16 times and hence the new pixel value of I$_{12}$ is stored in the register 36. The new pixel value [I$_{12}$] is fed to the memory 40 in response to the sequence signal.

The next new pixel data, viz. [I$_{13}$] is then interpolated as follows. The selectors 13 and 15 selects respectively the register 12 and the memory 10b. The adder 14 therefore adds (Sx +dX$_1$) and dX1, and applies Sx (integer) to the register 16 while applying dX$_1$·2 (fraction) to the register 17. The selectors 23 and 25 (FIG. 4B) respectively select the register 22 and the memory 20b. As a consequence, the adder 24 adds (Sy+dY$_1$) and dY$_1$, and applies Sy (integer) to the register 26 while applying dY$_1$·2 (fraction) to the register 27. The address controller 18 applies a control signal having a value of −1 to the adder 19 which responds thereto and outputs an address signal specifying the original pixel locations R$_{11}$″, R$_{21}$″, R$_{31}$″. At the same time the address control 28 applies a control signal having a value of 1 to the adder 29 and hence allows it to output an address signal specifying the original pixel locations R$_{11}$″, R$_{12}$″, R$_{13}$″ and R$_{14}$″. Consequently, the original pixel data [R$_{11}$″] is read out from the memory 30. On the other hand, a corresponding weight factor is read out from the weight factor memory 32. Thus, the outputs of the memory 30 and the weight factor memory 32 are multiplied at 35, added to the content of the register 36, and then stored in the register 36. It should be noted that in the initial stage the register 36 has been cleared zero. The operations similar to the above are repeated by 16 times and hence the new pixel value of I$_{13}$ is stored in the register 36. The new pixel value [I$_{13}$] is fed to the memory 40 in response to the sequence signal.

The following new pixel data [I$_{14}$], [I$_{15}$], ..., [I$_{1m}$] in the first row are sequentially determined by the processings similar to the above.

The interpolation of the first new pixel I$_{21}$ in the second row will be discussed, wherein the selectors 13 and 15 respectively select the register 11 and the memory 10c, thereby deriving therefrom Sx and dX$_2$. The selectors 23 and 25 respectively select the register 21 and the memory 20c for deriving Sy and dY$_2$ therefrom. It should be noted that the adder 14 feeds back its output to the registers 11 and 12 while the adder 24 feeds back its output to the registers 21 and 22. The subsequent steps for obtaining the new pixel data [I$_{21}$] is similar to the previously discussed examples, so that further discussions will be omitted for simplicity.

Subsequently, the second new pixel I$_{22}$ in the second row is interpolated, wherein the selectors 13 and 15 in turn select the registers 12 and 10b respectively for deriving (Sx+dX$_2$) and dX$_1$ therefrom. The adder 14 applies the sum (Sx+dX$_1$+dX$_2$) to the register 12 for updating the content thereof, and applies Sx (integer) and (dX$_2$+dX$_1$) to the registers 16 and 17 respectively. On the other hand, the selectors 23 and 25 select the register 22 and memory 20b respectively and derive (Sy+dY$_2$) and dY$_1$ therefrom. The adder 24 applies the sum (Sy+dY$_2$+dY$_1$) to the registers 21 and 22 for the renewal purpose, and applies Sy (integer) and (dY$_1$+-dY$_2$) (fraction) to the registers 26 and 27 respectively. The following steps for obtaining the new pixel data [I$_{22}$], which appears at the output terminal of the register 36 (FIG. 4C), is similar to the aforementioned steps so that further discussion will be omitted. The remaining new pixels $I_{23}$, $I_{24}$, ..., $I_{2m}$ in the second row are also successively interpolated in a manner similar to the above.

Thus, all the new pixel data ($=m \times n$) in locations $I_{11}$, $I_{21}$, ..., $I_{n(m-1)}$ and $I_{nm}$, are sequentially interpolated and fed to the memory 40 according to the algorithm specified by the equation (3).

The new pixel data from the register 36 are stored in the memory 40 in accordance with the following procedures. The coordinates Sx and Sy of the initial point are prestored in memories 45 and 46 respectively, while the integers "m" and "n" are prestored in registers 47 and 49 respectively. Since registers 42 and 44 are initially cleared zero, Sx is fed to the memory 40 via an adder 41 and the register 42, while Sy is fed to the memory 40 via an adder 43 and the register 44. Consequently, the first new pixel data $[I_{11}]$ is stored in the memory 40 in the address $I_{11}$ or R(Sx, Sy). The closed loop between the adder 41 and the register 42 allows the address in the M-axis direction to increase by one, while the adder 43 and the register 44 continue to apply the same Sy coordinate to the memory 40 during the storing process of the new pixels in the M-axis direction. The content of the register 47 (i.e., "m") is compared with the number of the operation steps at a comparator 48, and, upon coincidence, the comparator 48 applies a control signal to the register 42 for clearing it and also applies a control signal to the adder 43 for adding unity to Sy. Therefore, in the following steps, the new pixels in the second row are successively stored in the memory 40. These procedures are repeated, and when the comparator 48 outputs the control signal "n" times, a comparator 50 applies a signal to the register 44 for clearing it.

In the foregoing description, the registers 47 and 49 for storing "m" and "n" are arranged for controlling the writing of the new pixel data into the memory 40, but can be provided in a manner to control the memories 10a, 10b, 10c, 20a, 20b and 20c. Moreover, the data memories 30 and 40 are arranged to share one memory if addressed separately.

Figure 5:
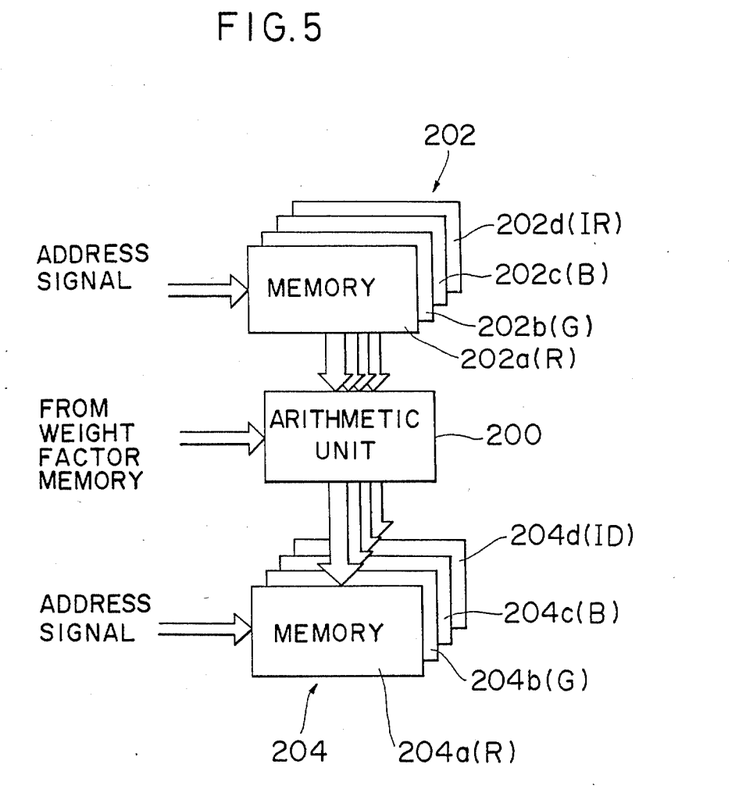
FIG. 5 is an illustration showing in block diagram form a second embodiment of the present invention which features high speed implementation of multiband digital image via cubic convolution interpolation.
Figure 6:
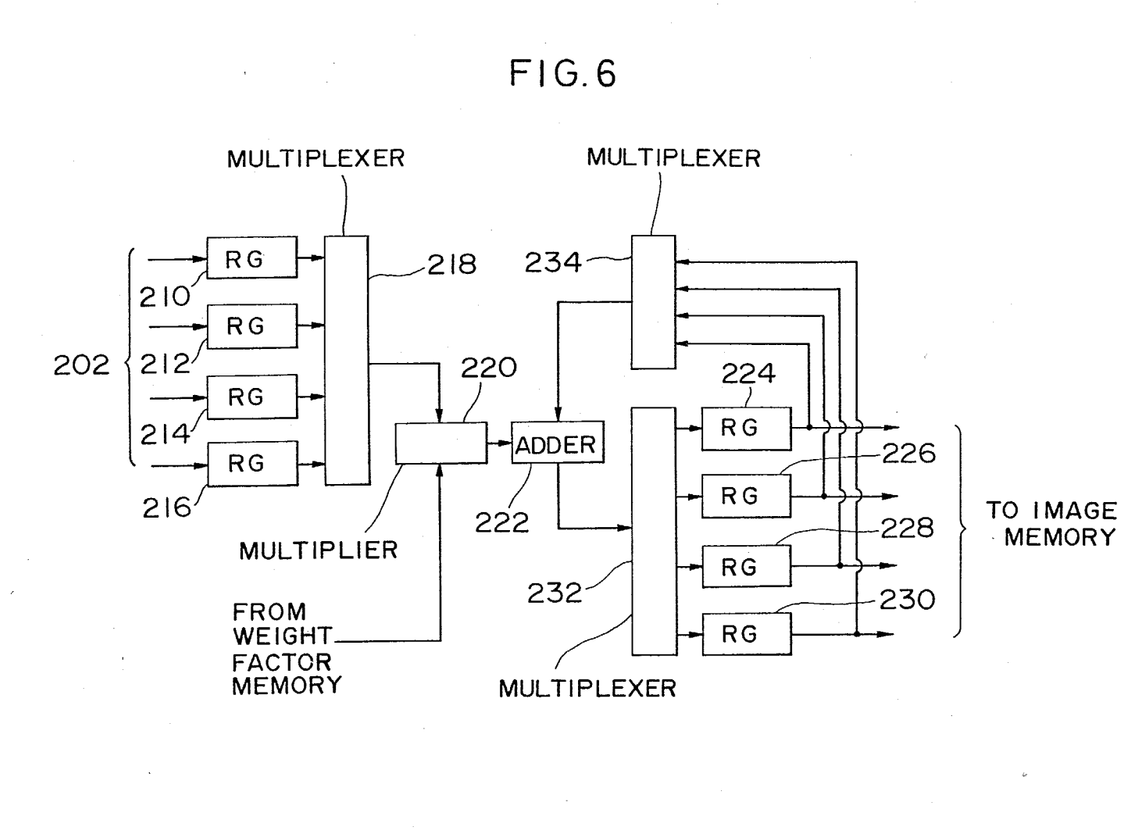
FIG. 6 is an illustration showing in block diagram form a detailed circuit of a portion of the FIG. 5 arrangement.

Reference is now made to FIGS. 5 and 6, in which there is shown in block diagram form a second embodiment of this invention. This embodiment is directed to an improvement of the section of FIG. 4C which involves the memories 30, 40, the registers 33, 36, the multiplier 34, and the adder 35. This embodiment is suited for implementing multiband digital image.

A color digital image generally involves three-band (i.e., red, green and blue) data, and further contains infrared band data in the case of remote sensing data transmitted from satellites. If such image data are read out of or written into an image data memory in serial, a problem is encountered that requires a large amount of wasteful time, in that the access time is much longer as compared with arithmetic time of digital image data. Therefore, this embodiment provides a circuit arrangement for implementing digital image at high speed with a simple circuit configuration.

FIG. 5 is a block diagram showing an arithmetic unit 200, and two memories 202 and 204 corresponding to the memories 30 and 40 (FIG. 4C), respectively. As shown, the memories 202 and 204 respectively involves four subdivisions 202a–202d and 204a–204d, which are assigned to four data bands (i.e., R (red), G (green), B (blue) and IR (infrared) bands). Four image data of one pixel, which are respectively stored in the four subdivisions 202a–202d, are read out therefrom in parallel in response to one address signal applied. The four data read out in parallel are fed to the arithmetic unit 200 which implements them in parallel. The parallel readout of the multiband data permits the access time to be lowered to one-fourth of the normal period.

FIG. 6 shows in more detail the arrangement of the arithmetic unit of FIG. 5. As shown, registers 210, 212, 214 and 216 respectively receive R, G, B and IR data. The outputs of the registers are connected through a multiplexer 218 to a multiplier 220. The multiplier 220 is connected to the weight factor memory 32 (for receiving a weight factor signal therefrom) and to an adder 222. The adder 222 is connected to registers 224, 226, 228 and 230 through a multiplexer 232. The registers 224–230 are arranged to output both to the memory 40 (FIG. 4C) and to a multiplexer 234 which has an output connected to the adder 222 as shown. The operation of this arrangment is such that the multiplexers 218, 232 and 234 serially feed the R, G, B and IR data through the above described circuit in a manner similar to which occurs in the embodiment of FIGS. 4A–4C. Therefore, a detailed discussion of same will be omitted.

The modification of the above embodiment may include more than the four registers 210–216 (224–230) so as to permit additional data (for example, ultra violet or the like) to be processed.

Figure 7A:
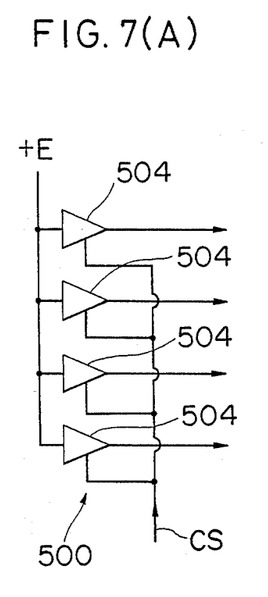
FIGS. 7(A) and 7(B) are illustrations showing in block diagram form three-state logic circuitry for use in a third embodiment of the present invention.
Figure 7B:
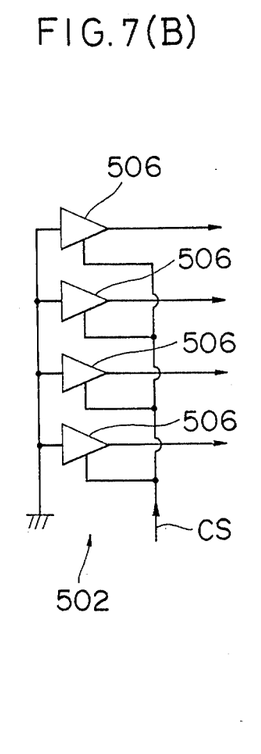
Figure 8:
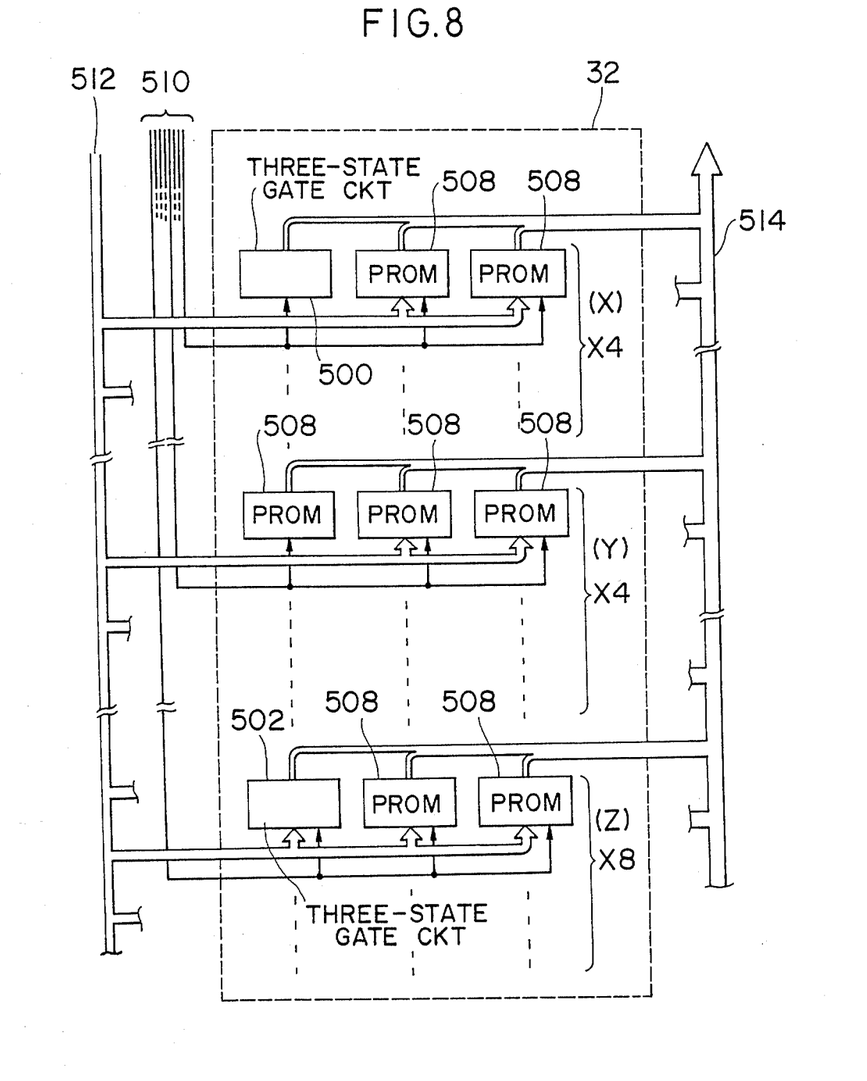
FIG. 8 is an illustration showing in block diagram form a weight factor memory using the circuitry shown in FIGS. 7(A) and 7(B)

Referring to FIGS. 7 and 8, there is shown in block diagram form a third embodiment of this invention, which is directed to an improvement of the weight factor memory 32 utilized in the foregoing embodiments.

Assuming that (1) each original unit square shown in FIGS. 1 through 3 is equally subdivided into 1024 ($=32 \times 32$ or $2^5 \times 2^5$) and (2) each weight factor is formed of 12 bits, then the weight factor memory 32 requires 192K bits capacity in that ($12 \times 1024 \times 16$) bits $= 196,608$ bits, wherein "16" indicates 16 weight factors for use in determining each new pixel data. As a consequence, in the case where 4K-bit PROMs (programmable read-only-memory) are employed for the memory 32, a total of 48 4K-bit PROMs is required. This means that a vast number of writing steps and an accompanying extremely large amount of time are needed in practice for producing the weight factor memory 32. This embodiment therefore provides an improved weight factor memory arrangemnt which requires a reduced number of PROMs and hence a reduced amount of time for writing thereinto the weight factor data.

Prior to a detailed description of this embodiment, the underlying principle thereof will be given hereinunder.

The weight factors $f_{ij}(a, b)$ are represented as follows, wherein each of i and j is a whole number integer between 1 and 4 inclusive, and "a" and "b" are the values disclosed in connection with FIG. 3:

$$f_{11} = (a^3 - 2a^2 + a) \cdot (b^3 - 2b^2 + b)$$

$$f_{12} = (a^3 - 2a^2 + a) \cdot (b^3 - 2b^2 + 1)(-1)$$

$$f_{13} = (a^3 - 2a^2 + a) \cdot (b^3 - b^2 - b)$$

$$f_{14} = (a^3 - 2a^2 + a) \cdot (b^3 - b^2) \cdot (-1)$$

$$f_{21} = (a^3 - 2a^2 + 1) \cdot (b^3 - 2b^2 + b) \cdot (-1)$$

$$f_{22} = (a^3 - 2a^2 + 1) \cdot (b^3 - 2b^2 + 1) \cdot (-1) \cdot (-1)$$

$$f_{23}=(a^3-2a^2+1)\cdot(b^3-b^2b)\cdot(-1)$$

$$f_{24}=(a^3-2a^2+1)\cdot(b^3-b^2)\cdot(-1)\cdot(-1)$$

$$f_{31}=(a^3-a^2-a)\cdot(b^3-2b^2+b)$$

$$f_{32}=(a^3-a^2-a)\cdot(b^3-2b^2+1)(-1)$$

$$f_{33}=(a^3-a^2-a)\cdot(b^3-b^2-b)$$

$$f_{34}=(a^3-a^2-a)\cdot(b^3-b^2)\cdot(-1)$$

$$f_{41}=(a^3-a^2)\cdot(b^3-2b^2+b)\cdot(-1)$$

$$f_{42}=(a^3-a^2)\cdot(b^3-2b^2+1)\cdot(-1)\cdot(-1)$$

$$f_{43}=(a^3-a^2)\cdot(b^3-b^2-b)\cdot(-1)$$

$$f_{44}=(a^3-a^2)\cdot(b^3-b^2)\cdot(-1)\cdot(-1)$$

The weight factors $f_{ij}$ can be divided into three groups based on an assumable value range:

(1) for $f_{11}$, $f_{14}$, $f_{41}$ and $f_{44}$, $0 \leq f_{ij}(a, b) < 0.02195$ (2) for $f_{22}$, $f_{23}$, $f_{32}$ and $f_{33}$, $0 \leq f_{ij}(a, b) \leq 1.0$ (3) for $f_{12}$, $f_{13}$, $f_{21}$, $f_{24}$, $f_{31}$, $f_{34}$, $f_{42}$ and $f_{43}$, $0 \geq f_{ij}(a, b) > -0.14815$.

Converting the decimal numbers in the above groups (1), (2) and (3), into corresponding binary numbers each having 10 digits to the right of the decimal point, we obtain, (1) for $f_{11}$, $f_{14}$, $f_{41}$ and $f_{44}$, 00.00 0000 0000 $\leq f_{ij}(a, b) <$ 00.00 0001 0110

(2) for $f_{22}$, $f_{23}$, $f_{32}$ and $f_{33}$, 00.00 0000 0000 $\leq f_{ij}(a, b) \leq$ 01.00 0000 0000

(3) for $f_{12}$, $f_{13}$, $f_{21}$, $f_{24}$, $f_{31}$, $f_{34}$, $f_{42}$ and $f_{43}$, 11.11 1111 1111 $\geq f_{ij}(a, b) >$ 11.11 0110 1010 wherein it should be noted that (1) each of the most significant bits is a sign bit denoting a positive number if "0" and a negative number if "1", and (2) each of the binary numbers in the group (3) is shown in 1's complement of the corresponding decimal number.

Viewing the above three groups reveals that the first 4-bit sections of each of the groups (1) and (3) are constant and equal with each other. It follows that there is no need to use PROMs for the constant number sections. Therefore, if 4K-bit PROMs having 4-bit outputs are employed, then number of 4K-bit PROMs can be reduced to 36, in other words, 12 4K-bit PROMs can be saved via this arrangement.

FIGS. 7(A) and 7(B) are illustrations showing gate circuits 500 and 502 for respectively outputting binary units of "0000" and "1111". The circuit 500 is a pull-down type and includes four three-state gates 504 each of which outputs a binary number "0" in response to a chip select signal CS and each of which provides high output impedance when not selected. The circuit 502 is a pull-down type and includes four three-state gates 506 each of which outputs a binary "1" in response to the chip select signal CS and each of which similarly provides high output impedance when not selected. The high output impedance allows the gate circuits 500 and 502 to be arranged in parallel with respect to the PROMs.

FIG. 8 is an illustration showing in block form one example of the fourth embodiment. This arrangement comprises the 12 three-state logic circuits 500, 502, and 36 PROMs 508 each having 4-bit output. As will be appreciated the whole arrangment is not shown for clarity. In FIG. 8, reference characters (X), (Y) and (Z) denote three subdivisions of the memory 32, which respectively correspond to the groups (1), (2) and (3) as mentioned previously. Each section consists of one three-state gate circuit and two PROMs (the subdivisions (X) and (Y)) or three PROMs (the subdivision (Z)) is rendered operative by a chip select signal via one of 16 lines denoted by 510. The selected section outputs one weight factor in response to an address signal applied thereto via an address bus 512. The weight factor read out is fed to a multiplier (not shown) via bus line 514.

In the foregoing description, the indication of the sign bit (i.e., the most significant bit) in the groups (1) through (3) may be reversed in a manner that "1" and "0" denote a positive and negative numbers, respectively. In this case, the first four bits of the group (3) are "0111" which can be realized by a combination of pull-down and pull-up gates. It is also possible that the weight factor memory 32 can be constructed of 16-bit PROMs in which case three 16-bit PROMs can be saved. Moreover, ROMs can be utilized in place of the PROMs.

Figure 9:
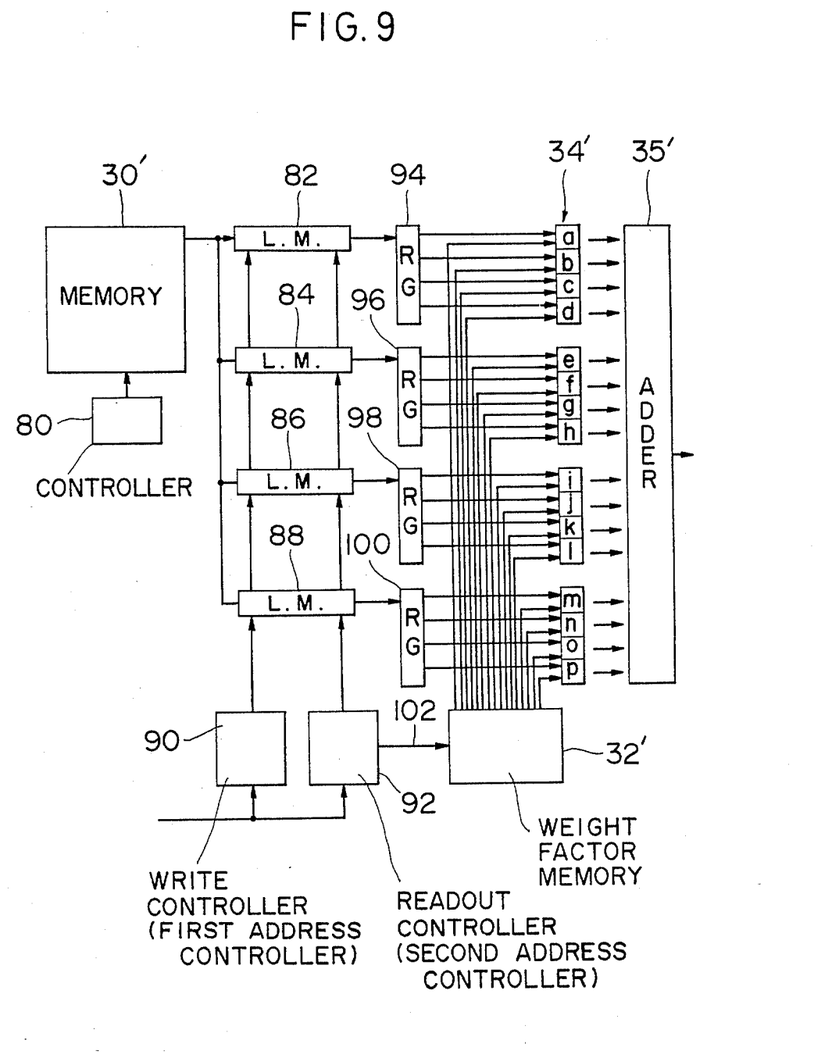
FIG. 9 shows in block diagram form a second embodiment of the present invention which finds particular application when high speed enlargement is required.

Referring now to FIG. 9, a fifth embodiment of this invention is shown in block diagram form. This embodiment is a modification of part of the first embodiment and is directed to obtaining a fine and clear enlarged digital image at high speed. It should be noted that coordinate conversion is not considered in this embodiment. In FIG. 9, the blocks denoted by reference numerals each having a prime (i.e., 30', 32', 34' and 35') correspond to the blocks 30, 32, 34 and 35 shown in FIGS. 4B and 4C, respectively. The memory 30' is provided with storing capacity of, for example, 512×512 pixel data each formed of 8 bits (for example). The pixel data contained in the memory 30' are read out, by four lines in this case, in response to line scanning control signals from a controller 80, and are respectively stored in corresponding four line memories (buffer memories) 82, 84, 86 and 88 under the control of a write controller 90. The readout rate of each pixel data is the order of 100 ns by way of example. The pixel data stored in the four line memories are read out in parallel at a lower rate than the writing speed by a desired integral multiple, and stored in corresponding registers 94, 96, 98 and 100. Since the write and readout controllers 90 and 92 are driven by an identical clock signal CLK, there exists at least one site between the two pixel data consecutively read out from each line memory for which new pixel data must be interpolated. A signal representing the fraction is fed, via a line 102, to the weight factor memory 32' which outputs 16 weight factors according to the signal applied. While, each of the registers 94, 96, 98 and 100 outputs 4 pixel data in parallel. The multiplier section 34' consisting of 16 multipliers "a" through "p", execute 16 multiplications at a time and apply the results thereof to the adder 35' at which they are summed. The output of the adder is stored in a memory similar to memory 40 disclosed in connection with the first embodiment.

In this embodiment, the number of line memories may be increased to 8, 12, 16, ... if desired. In this case, the first and second address controllers 90 and 92 are arranged to be alternately switched so as to perform the input and output operations continuously.

The foregoing description shows only a few embodiments of the present invention. Various modifications are of course possible without departing from the scope of the present invention which is only limited by the appended claims.

What is claimed is:

1. A digital image processing apparatus comprising:
   a first memory for containing original pixel data;
   a controller for controlling the data read out from said first memory;
   a first address controller;
   a second address conroller;
   first, second, third and fourth line memories operatively connected to said first memory for receiving adjacent lines of image pixel data at a first rate under the control of said first address controller and for reading out said image pixel data at a second rate under the control of said second address controller, said second rate being lower than said first rate;
   first, second, third and fourth registers operatively connected with said first, second, third and fourth line memories respectively for receiving the data read out from said line memories;
   a weight factor memory which is operatively connected to said second address controller;
   first, second, third and fourth groups of multipliers operatively connected to said first, second, third and fourth registers respectively, said first, second, third and fourth groups of multipliers being individually connected with said weight factor memory for receiving weight factors therefrom under the control of said second address controller;
   an adder which receives and sums the outputs of said multipliers; and
   a third memory for receiving and storing the data derived by said adder.

2. An apparatus according to claim 1, wherein said first memory contains pixel data which defines an image.

3. An apparatus according to claim 1, wherein said first and second address controllers are responsive to a clock pulse.

4. An apparatus according to claim 1, wherein said second address controller issues a signal indicative of the ratio of said second rate to said first rate to said weight factor memory.

5. A multiband digital image processing apparatus, comprising:
   (a) a first memory including at least three memory divisions, said first memory being provided for containing original pixel data;
   (b) a second memory containing a weight factor table therein;
   (c) a third memory including at lerast three memory divisions, said third memory being provided for storing new pixel data;
   (d) a first means for generating:
      (i) address signals for consecutively reading out, from said first memory, the original pixel data according to locations wherein said new pixel data are to be determined; and
      (ii) a control signal for selecting weight factors from said weight factor table according to said locations; and
   (e) a second means including:
      (i) a multiplier, a first multiplexer and a plurality of parallel connected registers which are arranged to receive the original pixel data read out from said first memory and which are coupled to said multiplier through said first multiplexer, said multiplier being connected to said second memory for receiving the selected weight factors therefrom;
      (ii) a second multiplexer and an adder for receiving the output of said multiplier and for applying the output thereof to said second multiplexer; and
      (iii) a third multiplexer and a second plurality of registers connected in parallel with said second multiplexer, the outputs of said second plurality of registers being connected to said adder through said third multiplexer and to said third memory.

6. An apparatus according to claim 5, further comprising a sequencer which controls the operational sequences of said first memory, second memory, third memory, first means and second means.

7. An apparatus according to claim 5, wherein said first means comprises a first address circuit for specifying a location of each of the original pixel data on a first coordinate axis, and a second address circuit for specifying a location of each of the original pixel data on a second coordinate axis.

8. An apparatus according to claim 7, wherein said first address circuit comprises:
   a fourth memory for containing a first coordinate of the origin of said first coordinate axis;
   a fifth memory for containing a first factor indicative of the displacement from said origin along said first coordinate axis;
   a sixth memory for containing a second factor indicative of the displacement from said origin along said first coordinate axis;
   a first register for receiving the output of said fourth memory;
   a second register;
   a first selector for selectively reading data from one of said first and second registers;
   a second selector for selectively reading data from one of said said fifth and sixth memories;
   a first adder for summing the values read by said first and second selectors;
   said adder being arranged to output on a first terminal a whole integer signal and fractional signal on a second output thereof;
   both of said first and second terminals being connected to said first and second registers for updating the contents thereof;
   a third register connected to said first terminal;
   a fourth register connected to said second terminal;
   the output of said fourth register being connected to said second memory;
   an address controller; and
   a second adder connected to said third register and said address controller.

9. An apparatus according to claim 7, wherein said second address circuit comprises:
   a fourth memory for containing a second coordinate of the origin of said second coordinate axis;
   a fifth memory for containing a first factor indicative of the displacement from said origin along said second coordinate axis;
   a sixth memory for containing a second factor indicative of the displacement from said origin along said second coordinate axis;
   a first register for receiving the output of said fourth memory;
   a second register;

a selector for selectively reading data from one of said first and second registers;

a second selector for selectively reading data from one of said fifth and sixth memories;

a first adder for summing the values read by said first and second selectors;

said adder being arranged to output on a first terminal a whole integer signal and fractional signal on a second output thereof;

both of said first and second terminals being connected to said first and second registers for updating the contents thereof;

a third register connected to said first terminal;

a fourth register connected to said second terminal;

the output of said fourth register being connected to said second memory;

an address controller; and a second adder connected to said third register and said address controller.

10. An apparatus according to claim 5, wherein said second memory comprises:

a plurality of read-only-memories each containing a plurality of weight factors; and a plurality of three-state gate circuits which each provides the function of a plurality of read-only-memories.

* * * * *